United States Patent
Hengelhaupt et al.

(10) Patent No.: US 6,668,605 B2
(45) Date of Patent: Dec. 30, 2003

(54) ANTI-THEFT DEVICE FOR CYCLES

(75) Inventors: Bernd Hengelhaupt, Zella-Mehlis (DE); Rüdiger Hengelhaupt, Sosua el Batey (DO)

(73) Assignee: Weih-Safe-Tec GbR, Suhl (DE)

(*) Notice: Subject to any disclaimer, the term of this patent is extended or adjusted under 35 U.S.C. 154(b) by 0 days.

(21) Appl. No.: 10/240,445

(22) PCT Filed: Jun. 7, 2001

(86) PCT No.: PCT/DE01/02132
§ 371 (c)(1), (2), (4) Date: Oct. 1, 2002

(87) PCT Pub. No.: WO01/98135
PCT Pub. Date: Dec. 27, 2001

(65) Prior Publication Data
US 2003/0136161 A1 Jul. 24, 2003

(30) Foreign Application Priority Data
Jun. 17, 2000 (DE) ......... 100 29 942

(51) Int. Cl.⁷ ............... B62H 5/00
(52) U.S. Cl. ............... 70/236; 70/233
(58) Field of Search ......... 70/233–236; 280/297

(56) References Cited

U.S. PATENT DOCUMENTS

| | | | |
|---|---|---|---|
| 509,175 A * 11/1893 | Leonard | ......... | 70/236 |
| 590,803 A * 9/1897 | Clarry | ......... | 70/236 |
| 592,242 A * 10/1897 | Eberle | ......... | 70/236 |
| 704,655 A * 7/1902 | Morgan | ......... | 70/236 |
| 839,584 A * 12/1906 | Hayford et al. | ......... | 70/236 |
| 4,028,915 A * 6/1977 | Stahl | ......... | 70/233 |
| 4,284,290 A * 8/1981 | Ragsdale | ......... | 70/236 |

FOREIGN PATENT DOCUMENTS

| | | | |
|---|---|---|---|
| DE | 445 139 | 10/1926 | |
| DE | 3100905 A1 * | 8/1982 | ......... B62H/5/16 |
| DE | 3211704 A1 * | 10/1983 | ......... B62H/5/10 |
| DE | 43 06 562 | 9/1994 | |
| DE | 195 31 315 | 8/1995 | |
| DE | 197 53 024 | 6/1999 | |
| DE | 100 29 942 | 6/2000 | |
| EP | 0 630 802 | 12/1994 | |
| GB | 1 474 834 | 5/1977 | |
| NL | 8100343 | 1/1981 | |
| WO | WO 9111358 A1 * | 8/1991 | ......... B62H/5/20 |

* cited by examiner

*Primary Examiner*—Anthony Knight
*Assistant Examiner*—Christopher J. Boswell
(74) *Attorney, Agent, or Firm*—Collard & Roe, P.C.

(57) ABSTRACT

The invention relates to an anti-theft device for cycles comprising one or more frame tubes and a pedal crank housing attached thereto, characterised in that a through drilling is arranged in the middle of the pedal crankshaft as well as of the fixing screws. In the mid-region of the pedal crankshaft is a recess in which a lock housing with a cylinder lock is arranged. The key of the cylinder lock axially extends through the fixing screw closest to the cylinder lock. On the opposing front face of the cylinder lock an eccentric pin is arranged which co-operates with the front face of a slider displaceably arranged in the recess, by means of an eccentric pin guide. In the front face of the slider, opposite to the eccentric pin guide, a locking groove with a central drilling is arranged, into which the locking head of a lock pin, arranged in the through drilling of the second fixing screw and the pedal crankshaft extends. On the end of the lock pin, extending beyond the fixing screw the pin head is arranged with the adjacent ring guide on the pedal crank side, to which a locking ring is fixed. A flexible securing element, for example, a high-tensile strip, a steel cable or a chain is fixed to the locking head as well as the locking ring.

9 Claims, 4 Drawing Sheets

ANTI-THEFT DEVICE FOR CYCLES

CROSS REFERENCE TO RELATED APPLICATIONS

Applicants claim priority under 35 U.S.C. §119 of German Application No. 100 29 942.3 filed Jun. 17, 2000. Applicants also claim priority under 35 U.S.C. §365 of PCT/DE01/02132 filed Jun. 7, 2001. The international application under PCT article 21 (2) was not published in English.

The invention relates to an anti-theft device for bicycles comprising one or more frame tubes and a pedal crank housing attached thereto.

Anti-theft devices with all kinds of different types of construction have been developed for preventing the unauthorized use of bicycles. For example, steel cable, chain or bow-type locking systems are known in the prior art, by means of which bicycles can be secured against theft. With such anti-theft devices, the bicycle is linked to, for example a stationary object (such as, for example a bicycle parking frame or the post of a street lamp, etc.) in order prevent its unauthorized use.

In addition to such separate types of construction, locking systems comprising securing steel cables of the type introduced, for example in GB 1 474 834, which are arranged on the bicycle, have become known as well.

Owing to the fact that the purchase costs of the bicycles are often relatively high, high-quality steel cable, chain or bow-type locks comprising high-quality locking systems are, of course, offered as well.

One of the major drawbacks of such high-quality security locks for bicycles is the high transport weight of the locking system, in particular the weight of the casing enclosing the locking system.

Therefore, it needs to be noted in general that in conformity with the current trend, high-quality bicycles are built with increasingly lighter weights, whereas the weight of the bicycle safety locks to be associated with such high-quality bicycles paradoxically becomes increasingly heavier at the same time.

Because of the low depth of installation of the safety lock, even the bicycle safety locks described in the prior art that are separately secured on the frame of the bicycle, can be forcibly opened through targeted manipulations even if such safety locks comprise the most stable type of construction of a steel cable, a chain or a bow, or by destroying the safety lock by force. This means that even with such types of construction of the safety lock that are connected with a high transport weight, the thief is able to drive away with a fully functioning bicycle after the lock has been broken open.

Now, other different variations of bicycle safety devices have been developed as well for preventing such "driving away".

A system for locking the pedals of the bicycle has been introduced, for example in DE 195 31 315 A1. The rotational movement of the pedals of the bicycle is blocked by means of this locking system.

The drawback in conjunction with this type of construction is the fact that the thief, after he has pushed the bicycle, for example to a "safe location", can replace the pedals of the bicycle by a new pair of bicycle pedals after simply unscrewing and removing the original pair of pedals, and will quickly have again a fully functioning bicycle in this way.

It has been proposed in connection with other types of construction to block the pedal crankshaft by means of a locking system. Such locking systems for blocking the pedal crankshaft have been described earlier in NL 8100343, in DE 43 06 562 C2, and in EP 0 630 802.

However, the locking system described in the above documents can be used only in special types of construction of the frame, and cannot be fitted at a later time in most cases.

The locking system for blocking the pedal crankshaft introduced in DE 197 53 024 C2, which comprises a sleeve body that is formed by two bushes that can be pushed one into the other, whereby one bush is connected with the one and the other bush with the other of the two flanges, and whereby the blocking slide has to engage both bushes at the same time so as to prevent the flanges from being unscrewed in the locked condition after the pedals have been removed, can in fact be employed in a universal manner. However, this system requires high manufacturing and installation expenditures and, moreover, has a drawback in common with the pedal bearing blocking systems described already in the prior art, such disadvantage being the fact that the entire bicycle can be pushed or carried away in spite of the fact that the pedal crankshaft is locked with such a system. This means that it is not possible to prevent the theft of the entire bicycle, and it is neither possible to prevent the stolen bicycle from being dismantled at a later time into "usable individual components".

If the thief destroys, for example the lightweight frame of the bicycle after he has pushed the bicycle away and has subsequently manipulated the blocked pedal crankshaft, and in case the complete bicycle has been recovered again, no insurance company will replace the frame that has been destroyed by the manipulations on the system blocking the pedal crankshaft.

Therefore, the present invention is based on the problem to eliminate the drawbacks mentioned above in connection with the prior art, and to develop an anti-theft device for bicycles that can be manufactured in a simple manner in terms of manufacturing technology. Such an anti-theft device prevents the bicycle from being pushed or carried away by unauthorized persons, and it is characterized by a very high-quality locking system that is difficult to access and has a low transport weight; that can be fitted at a later time on all types of different bicycle frame constructions and on any type of material of a bicycle frame (even on materials of the lightweight type) at low cost and with minor installation expenditure; and that, furthermore, prevents the frame of the bicycle from being destroyed even if sub-assemblies of the locking system have been subjected to extremely high stress due to forceful intervention.

Said problem is solved by means of an anti-theft safety device for bicycles comprising one or more frame tubes (1) and a pedal crankshaft guide (2) attached thereto, whereby a right-hand and a left-hand bearing receptacle (3) each accommodating an antifriction bearing (4) is supported in the pedal crankshaft guide (2) on the one and the other sides, and whereby a pedal crankshaft (5) is supported in said bearings in a rotating manner; whereby a chain sprocket wheel (6) with a pedal crank (7) is arranged on the one end of the pedal crankshaft (5), and a pedal crank (7) is arranged at the opposite end of the pedal crankshaft (5); with the pedal cranks each being screwed on either side to the pedal crankshaft (5) by means of a fixing screw (8).

In this connection, it is essential to the invention as well that the central through-extending bores (9) are arranged both axially in the pedal crankshaft (5) and axially in the fixing screws (8), and that the pedal crankshaft (5), which is dimensioned thicker with respect to its outside diameter in the mid-region (10), is provided in said region with a radial recess (11), in which both a lock housing (12) with a cylinder lock (13) and a slider (17) are arranged, whereby the key (14) of the cylinder lock (13) axially penetrates the fixing screw (8) located closest to the cylinder lock, but projects beyond said fixing screw with an actuator piece (15).

By virtue of the fact that the locking system is arranged in a low location in the pedal crankshaft and the installation depth is high at the same time in the middle of the pedal crankshaft, the locking system is difficult to access particularly for undesirable manipulations.

Furthermore, the "protected" accommodation of the cylinder lock in the middle of the functionally conditioned pedal crankshaft as defined by the invention, is characterized by an extremely low additional transport weight.

Furthermore, a characterizing feature is the fact that an eccentric pin (16) is arranged on the opposite face side of the cylinder lock (13). Via an eccentric pin guide (18), said eccentric pin is actively connected with a slider (17), which is arranged in a displaceable manner in the recess (11) on one face side. By turning the key (14) of the cylinder lock (13), the eccentric pin (16) moves in part of a circular track, and due to its cooperation with the eccentric pin guide (18), the latter being arranged on the slider (17), effects a progressive displacement of the slider (17) in its linear guides, which are arranged in the mid-region (10) of the pedal crankshaft (5).

It is important in this connection that a locking groove (19) provided with a center bore (21) is arranged in the face side of the slider (17) that is disposed opposite the eccentric pin guide (18). The locking head (23) of a lock pin (22) of a fastening system, which locking head can be inserted through the through-extending bore (9) in the opposite, second fixing screw (8) and the recess (11) in the pedal crankshaft (5), projects into said locking groove.

According to the invention, in the "unlocked" position, the central bore (21) of the slider (17) is located in the center position, so that the locking head (23) of the lock pin (22) can be fully inserted in the locking groove (19). Now, when the key (14) of the cylinder lock (13) is turned on its actuator piece (15), which is projecting beyond the fixing screw (8), the eccentric pin (18) moves in its circular track, and due to its cooperation with the eccentric pin guide (18) that is arranged on the slider (17), effects a progressive displacement of the slider (17) in its linear guide arranged in the mid-region (10) of the pedal crankshaft (5). The "arresting range" of the locking groove (19) not covered by the central bore slides in this connection into the free thrust zone (20) of the lock pin (22) immediately following the locking head (23), so that in this way, the lock pin (22) is exactly positioned "in the pedal crankshaft (5)" in the axial direction.

It is essential to the invention as well, furthermore, that the slider (17) can be provided with a greater height, i.e., it can be dimensioned in such a way that in the locking position, it "drives into" a recess (31) of a bearing receptacle (3) that is extended by a locking bush (32). What is effected at the same time by means of this arrangement as defined by the invention, with an exact axial positioning of the lock pin in the pedal crankshaft, is that the rotational freedom of the pedal crankshaft is blocked when the lock pin is arrested.

By virtue of this arrangement as defined by the invention, comprising, for example a chain, a locking bow etc., it is not possible to turn out the pedal crankshaft blocked by only one locking bush (32). Furthermore, due to the solution as defined by the invention, even the pedal cranks cannot be dismantled "in the locked condition".

Furthermore, it is a characteristic feature that the recesses (31) provided in the locking bush (32) are preferably arranged in such a manner that the slider (17) engages the recesses (31) always with the pedals being in the vertical position.

When the pedals are in such a vertical position, it is not possible, furthermore, to generate a high torque for the pedal crankshaft.

A further feature of the invention consists in that the pin head (24) with an adjacent ring guide (25) located on the side of the pedal crankshaft, is arranged on the end of the lock pin (22) of the fixing system projecting beyond the fixing screw (8), said ring guide having a locking ring (26) mounted on it, whereby a flexible securing element (27) such as, for example a high-tensile strip, a steel cable or a chain is secured on both the locking head (23) and the locking ring (26).

Now, before the locking head (23) is arrested, when the flexible securing element (27)—which is arranged with its one end on the pin head (24) and with its other end on the locking ring (26)—is looped, for example around a post, and additionally passed through the two wheels of the bicycle, the locking head (23) of the lock pin (22) can be arrested in the pedal crankshaft (5) as defined by the invention after the locking ring (26) has been plugged over the ring guide (25) of the lock pin (22).

Furthermore, it is essential to the invention as well that a separate connector piece (28) having a securing element (27) mounted on it, is arranged on the lock pin (22) in such a way that the lock pin (22) is connected with the connector piece (28) in a form-locked manner by affixing the locking ring (26) to it. This type of embodiment as defined by the invention is used when the anti-theft device comprising this variation of its construction is employed without blocking the pedal crankshaft in the locked condition, the purpose being in particular to minimize the transport volume of the sub-assemblies of the construction in their locked condition, and to permit the lock pin (22)—which is not provided with a securing element (27)—to remain in and, at the same, to be "locked" in the pedal crankshaft (5) when the bicycle is used for a ride, so that the lock pin (22), which is somewhat bulky because of its length (in the variation of the construction according to claim 1), then will not have to be transported separately. This type of construction of the solution as defined by the invention prevents soiling of the functional subassemblies of the construction arranged in the pedal crankshaft because the lock pin (22) remains in the through-extending bore (9). Owing to the design of the locking ring (26) and also of the pin head (24) as defined by the invention, said components being made of hardened or high-strength material; in conjunction with the arrangement of these components as defined by the invention directly in front of the fixing screw (8) of the pedal crank (7), any unauthorized dismantling of the pedal crankshaft (5) is prevented, as mentioned before, so that the solution as defined by the invention supplies the user with a high-quality locking system that is difficult to access; that has a low transport weight; and that can be fitted at a later time on all types of construction of bicycle frames and all types of materials of bicycle frames (even including the lightweight type of construction) at favorable cost; and, at the same time, prevents any destruction of the bicycle frame due to extreme stressing of the sub-assemblies of the locking system as a result of forceful intervention with this system.

Another variation of the embodiment of the invention is characterized in that a locking bow (33) is arranged on the lock pin (22). Now, this locking bow may connect, for example the pedal crankshaft, a pole or also a lamp post and different subassemblies of the frame with one another in a force-locked manner, so that any theft of the bicycle can be prevented in this way as well.

Furthermore, the fact that the locking ring (26), the pin head (24) and the locking bow (33) are made of hardened or high-strength material is important to the invention as well. On the side of the material, any intentional destruction of the anti-theft device as defined by the invention is counteracted by virtue of this special use of such a material.

Another characterizing feature is the fact that cover elements may be arranged on the through-extending bore holes (9) of the fixing screws (8) on one or both sides. Such cover elements prevent soiling of the functional subassemblies arranged in the pedal crankshaft (5) when the lock pin (22) is not inserted and/or the key (14) is removed.

It is essential, furthermore, that in connection with special types of construction, the key (14) can be pulled out only when the locking system is in the locked condition, so that on the one hand, any soiling of the functional subassemblies arranged in the pedal crankshaft can be counteracted, whereby in conjunction with these special types of construction, the key can be submitted, for example to insurance companies as evidence that the anti-theft device had been activated.

In addition to those contained in the text of the claims, additional features, details and advantages of the invention are revealed also in connection with the associated drawings and by the following explanations pertaining to the exemplified embodiments.

Figure 1:
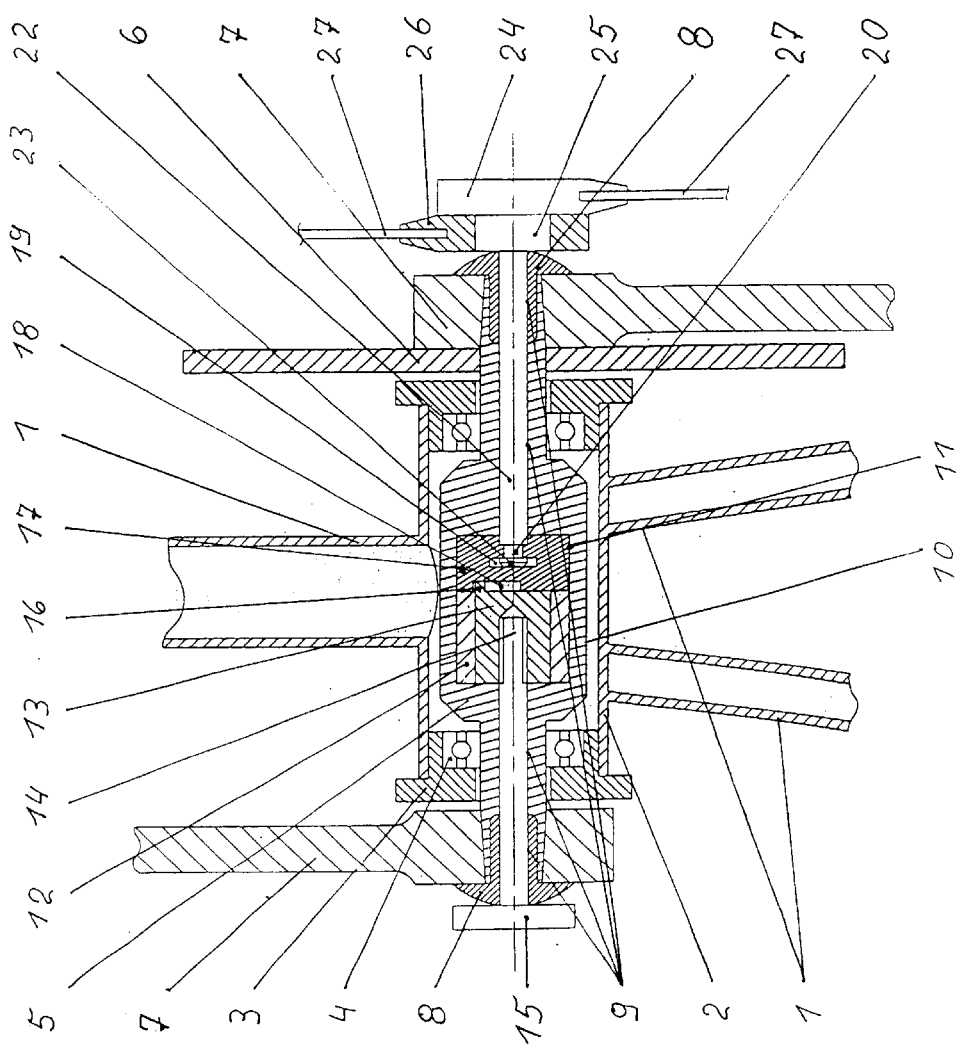
FIG. 1 is a sectional representation of the anti-theft device as defined by the invention, without blockage of the pedal crankshaft.

The anti-theft device for bicycles as defined by the invention and shown by a sectional view in FIG. 1 shows a pedal crankshaft guide 2 comprising the three frame tubes 1 arranged on the crankshaft guide.

The bearing receptacles 3, which each comprise an antifriction bearing 4, are arranged in the pedal crankshaft guide 2 on both sides, i.e. one on the left-hand and the right-hand sides. A pedal crankshaft 5 is supported in said antifriction bearings 4 in a rotating manner. A sprocket wheel 6 with a pedal cam 7 is arranged on one end of the pedal crankshaft 5. The second pedal cam 7 is arranged on the opposite end of the pedal crankshaft 5. The two cams each are screwed to the respective end of the pedal crankshaft 5 by means of a fixing screw 8.

A central, through-extending bore 9 is arranged both in the pedal crankshaft 5 and in the fixing screws 8. The mid-region 10 of the pedal crankshaft 5 neighboring on the bearing points has a larger dimensioned outside diameter and is provided with a recess 11.

Figure 3:
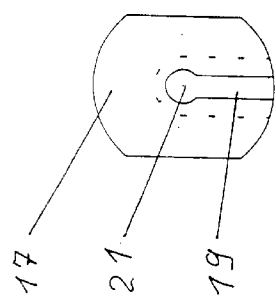
FIG. 3 is a front view of the locking element in the form of the slider 17.

A lock housing 12 with a cylinder lock 13 is located in said recess 11. The key 14 of the cylinder lock 13 projects axially through the fixing screw 8 that is located closest to the cylinder lock. The actuator piece 15 of the key 14 protrudes beyond the fixing screw 8. An eccentric pin 16 is arranged on the opposite face side of the cylinder lock 13. Said eccentric pin is actively connected with the slider 7, the latter being arranged in the recess 11 in a displaceable manner, via an eccentric pin guide 18 arranged in one face side of the slider 17 (see also FIG. 3). When the key 14 of the cylinder lock 13 is turned, the eccentric pin 16 moves along a part circle, and due to its cooperation with the linearly displaceable arrangement of the slider 17 in the recess 11, effects a progressive displacement of the slider 17 in the mid-region 10 of the pedal crankshaft 5 and the eccentric pin guide 18 arranged on the slider 17.

Figure 4:
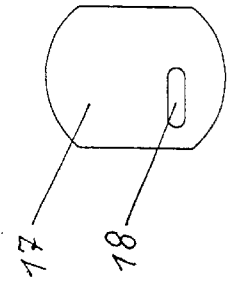
FIG. 4 is a back view of the locking element, which is the slider 17.

As shown in FIG. 4, a locking groove 19 comprising a central bore 21 is arranged in the opposite face side of the slider 17. In the unlocked condition, the central bore 21 of the slider 17 is in the center position, so that the locking head 23 of the lock pin 22 can be completely inserted in the locking groove 19. Now, when the key 14 of the cylinder lock 13 is turned on its actuator piece 15 projecting beyond the fixing screw 8, the eccentric pin 16 moves in its circular track, and owing to its cooperation with the eccentric pin guide 18 arranged on the slider 17, effects a progressive displacement of the slider 17 in its linear guide arranged in the mid-region 10 of the pedal crankshaft 5. The arresting area of the locking groove 19 not covered by the central bore slides in this connection across the free thrust 20 of the lock pin 22, which is located directly behind the locking head 23. Said movement exactly positions the lock pin 22 in the axial direction in the pedal crankshaft 5.

The sectional representation according to FIG. 1 shows the locking head 23 of a lock pin 22. Said locking head projects into said locking groove 19. Said lock pin 22 projects beyond the "second" fixing screw 8 with its ring guide 25 and the pin head 24. A locking ring 26 is clipped to the ring guide 25.

A flexible securing element 27 (for example a high-tensile strip, a steel cable or a chain) is arranged both on the locking head 23 and the locking ring 26.

Figure 2:
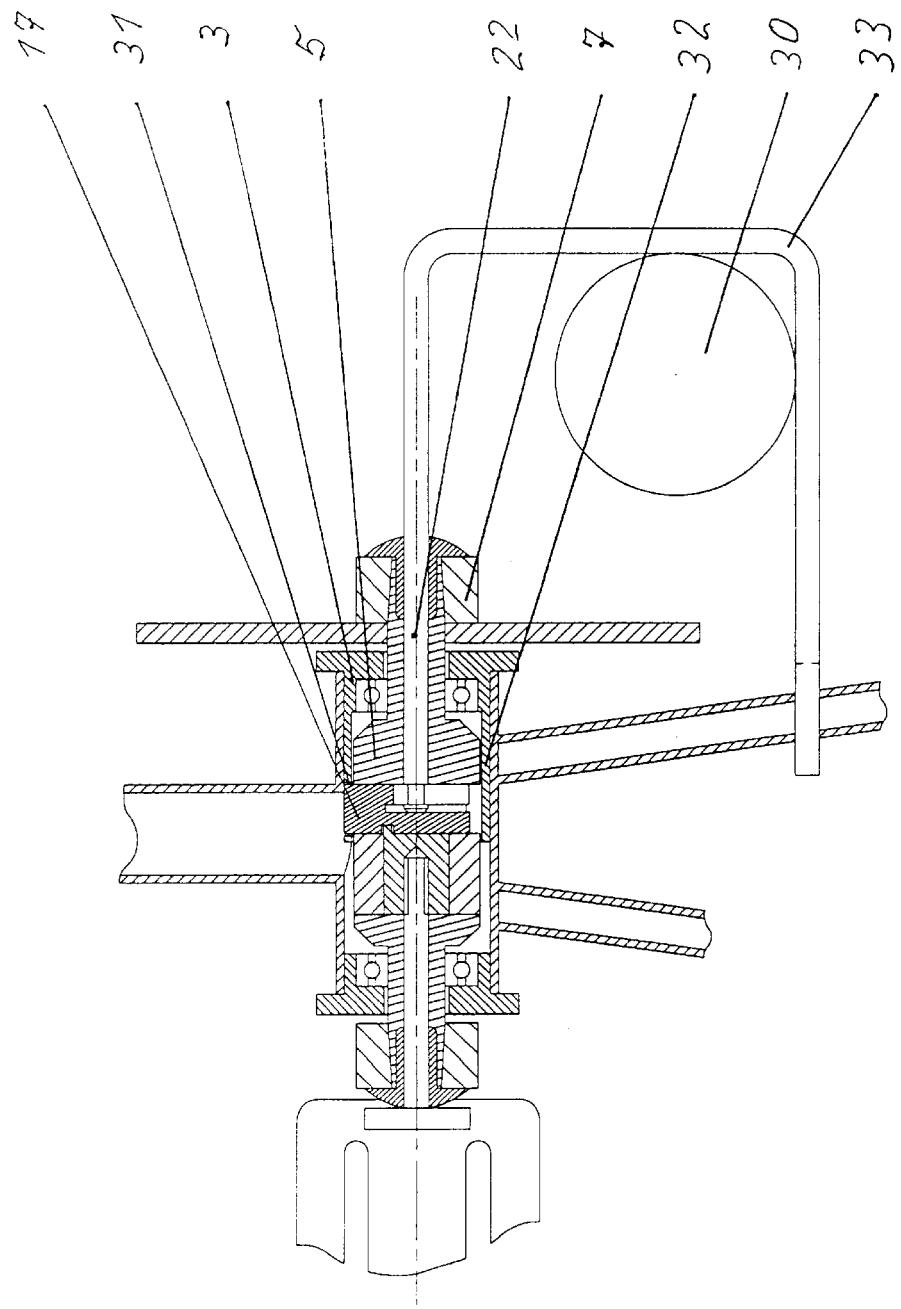
FIG. 2 is a sectional representation showing a top view of the anti-theft device as defined by the invention, with blockage of the pedal crankshaft as defined by the invention.

In the present embodiment, a locking bow 33 is arranged on the lock pin 22. As shown in FIG. 2, this locking bow connects, for example the pedal crankshaft 5, a lamp post 30 and different subassemblies of the frame with one another in a form-locked manner.

By virtue of the fact that the locking system is arranged in the pedal crankshaft; that a very low height of the installation space is associated with such an arrangement; and that a large installation depth in the center of the pedal crankshaft is connected at the same time with the solution as defined by the invention as well, the locking system is rendered very difficult to access for undesirable manipulations. The protected accommodation of the cylinder lock as defined by the invention in the center of a functionally conditioned subassembly effects at the same time an extremely low additional transport weight.

Figure 7:
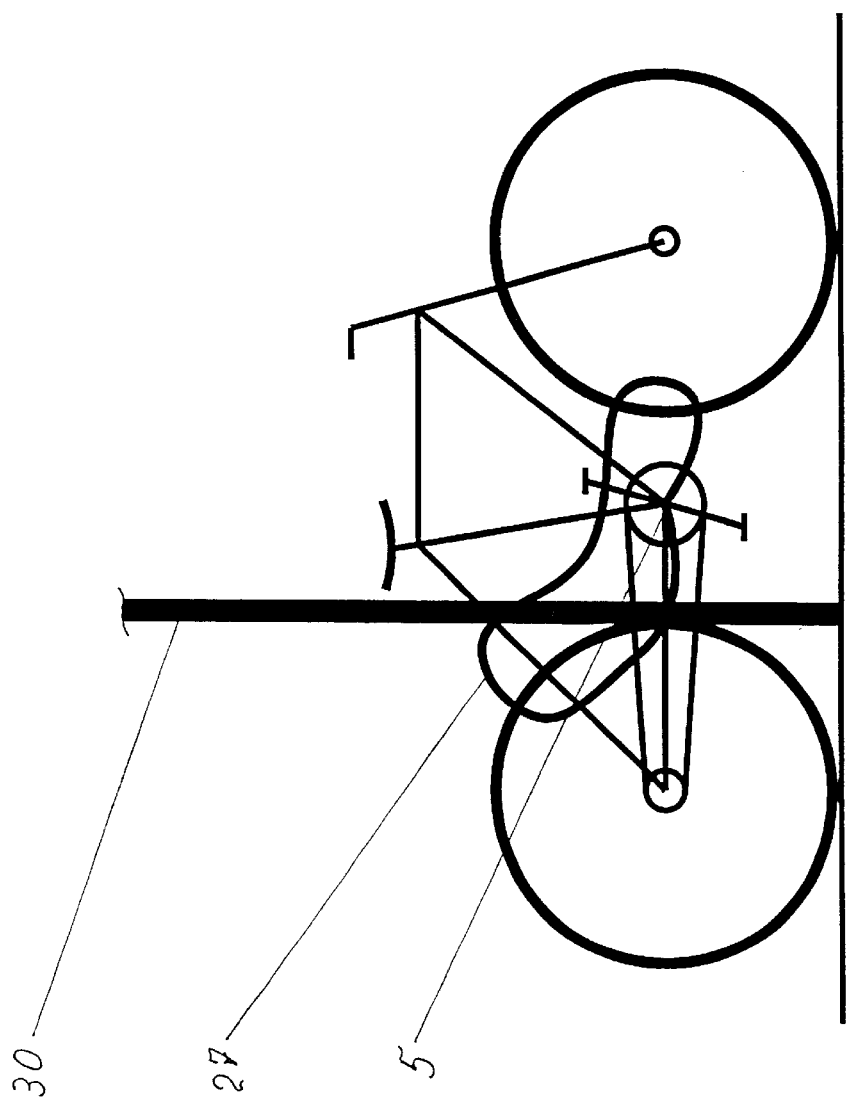
FIG. 7 shows the bicycle "locked" to a lamp post by means of a security element incorporated in the solution as defined by the invention.

For securing the bicycle against theft, the flexible securing element, which is arranged with its one end on the pin head 24, as shown, for example in FIG. 7, is looped around the lamp post 30, through the two wheels of the bicycle, and after the locking ring 26—which is connected with the securing element 27 as well—has been plugged over the ring guide 25 of the lock pin 22, the lock pin head 23 is arrested in the pedal crankshaft 5, in the manner explained already in the foregoing.

By virtue of the fact that the locking ring 26 and the pin head 24 are made of hardened or high-strength material, and the fact that the locking ring 26 and the pin head 24 are arranged as defined by the invention directly in front of the fixing screw 8 of the pedal crank 7, the latter is protected against unauthorized removal, and the solution as defined by the invention prevents at the same time any unauthorized removal of the pedal crankshaft 5.

FIG. 2 shows the anti-theft device as defined by the invention by a sectional top view with a different type of construction, comprising at the same time blockage of the pedal crankshaft.

The length of the slider 17, which is arranged in the pedal crankshaft 5, is so dimensioned that, in the locking position, the slider engages ("drives into") the recess 31 of a bearing receptacle 3 extended by a locking bush 32.

In conjunction with the exact axial positioning of the lock pin 22 in the pedal crankshaft 5, the effect achieved by this arrangement as defined by the invention is that the rotational freedom of the pedal crankshaft 5 is blocked when the lock pin 22 is arrested.

Any removal of the pedal crankshaft 5—which is arrested in only one locking bush 32—by turning it out, is not possible due to the special arrangement of the subassemblies of the anti-theft device as defined by the invention, because "in the locked condition", neither the two pedal cranks 7 can be removed as a result of the solution as defined by the invention.

As shown in FIG. 2, the locking bow 33, which, according to the invention, is provided with a lock pin 22 and anchored with said lock pin 22 in the pedal crankshaft 5, connects the pedal crankshaft 5, a lamp post 30 and different subassemblies of the bicycle frame with each other in a form-locked manner in such a way that theft of the bicycle can be prevented.

The recesses 31 are preferably arranged in this connection in the locking bush 32 in such a way that the slider 17 engages the recesses 31 always only when the pedal crank 7 is in a vertical position.

When the pedal is in such a vertical position, it is not possible to apply a torque to the pedal crankshaft that would be adequately high, for example for deforming securing elements, or that could change the position of such securing elements.

Figure 5:
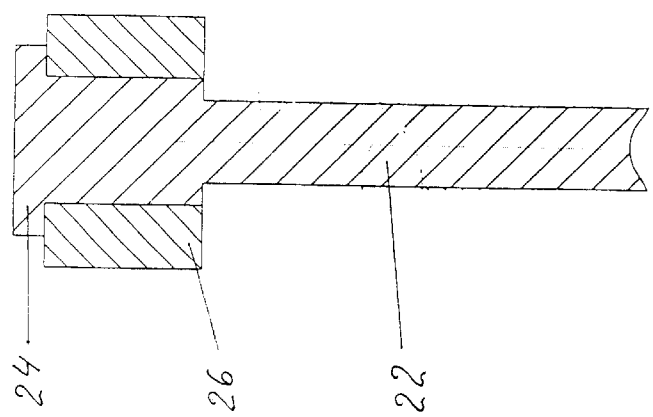
FIG. 5 shows a special embodiment of the lock pin 22.

FIG. 5 shows the lock pin 22 in another special embodiment, with the short pin head 24 and the large locking ring 26 with a mode of operation analogue to the one described in connection with FIG. 1.

Figure 6:
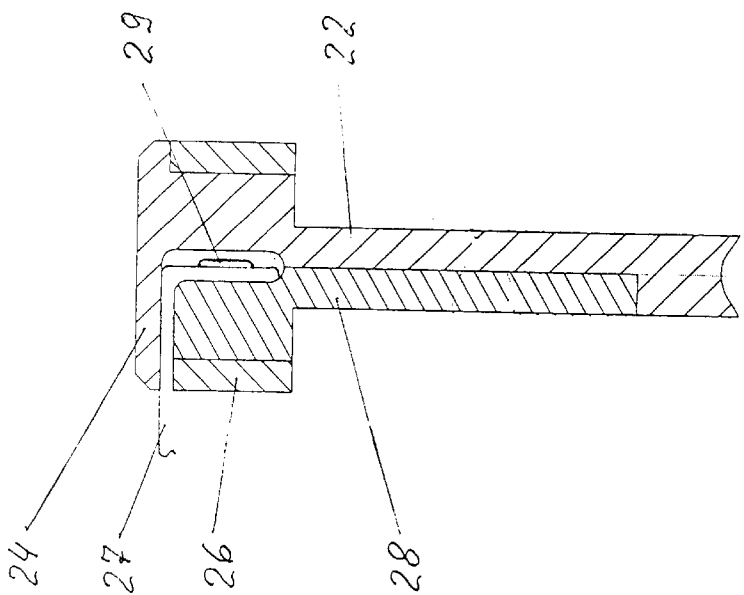
FIG. 6 shows another special embodiment of the lock pin 22.

FIG. 6 shows a special embodiment of the lock pin 22 as defined by the invention. In the present embodiment, which comprises a specially shaped, divided lock pin 22, the connector piece 26 is inserted in the lock pin 22 with the securing element 27, which is fastened on said connector piece by means of a securing element 29. Both structural components are subsequently connected in a form-locked manner as shown in FIG. 6, by attaching the locking ring, on which the other end of the securing element is preferably arranged.

The lock pin 22 is arrested again in the pedal crankshaft according to the functional principle described already above in connection with FIG. 1.

The present type of embodiment, in conjunction with the type of construction of the solution as defined by the invention that is blocking the rotation of the pedal crankshaft, especially serves the purpose of minimizing the transport volume of the subassemblies to be transported, and, in conjunction with the type of construction not comprising blockage of the pedal crankcase (only claim 1), permits the lock pin 22 to remain in place and to lock the lock pin 22—which is not provided with a securing element 27—in the pedal crankshaft 5, so that the bulky lock pin 22 will not have to be transported separately either while riding the bicycle or when the bicycle is in the locked condition, while any soiling of the functional subassemblies arranged in the pedal crankshaft is avoided at the same time due to the fact that the lock pin 22 remains in place in the through-extending bore 9.

FIG. 7 shows a bicycle that is "locked" in the pedal crankshaft 5 to a lamp post 30 by means of a securing strip 27 according to the solution as defined by the invention.

With the solution as defined by the invention, it has been possible to develop an anti-theft device for bicycles that can be manufactured in a simple manner in terms of manufacturing technology; that prevents the bicycle from being pushed or carried away; that is characterized by a very high-quality locking system that is difficult to access and has a low transport weight; that can be fitted at a later time on all types of construction of bicycle frames and all types of bicycle frame materials (and even on lightweight materials) at favorable cost and with low installation expenditure; and that prevents the bicycle frame from being destroyed if the subassemblies of the locking system are extremely stressed due to forceful intervention with the system.

| List of Reference Numerals | |
|---|---|
| 1 | Frame tube |
| 2 | Pedal crankshaft guide |
| 3 | Bearing receptacle |
| 4 | Antifriction bearing |
| 5 | Pedal crankshaft |
| 6 | Chain sprocket wheel |
| 7 | Pedal crank |
| 8 | Fixing screws |
| 9 | Through-extending bore |
| 10 | Mid-region |
| 11 | Recess |
| 12 | Lock housing |
| 13 | Cylinder lock |
| 14 | Key |
| 15 | Actuator piece |
| 16 | Eccentric pin |
| 17 | Slider |
| 18 | Eccentric pin guide |
| 19 | Locking groove |
| 20 | Free zone |
| 21 | Centering bore |
| 22 | Lock pin |
| 23 | Locking head |
| 24 | Pin head |
| 25 | Ring guide |
| 26 | Locking ring |
| 27 | Securing element |
| 28 | Connector piece |
| 29 | Fixing element |
| 30 | Lamp post |
| 31 | Recess |
| 32 | Locking bush |
| 33 | Locking bow |

What is claimed is:

1. An anti-theft device for bicycles comprising one or more frame tubes (1) and a pedal crankshaft guide (2)

attached thereto, whereby a right-hand and a left-hand bearing receptacle (3) with antifriction bearings (4) are arranged in the pedal crankshaft guide (2) on each of the two sides, in which a pedal crankshaft (5) is supported in a rotating manner; whereby a chain sprocket wheel (6) with a pedal crank (7) is arranged on the one end of the pedal crankshaft (5), and a pedal crank (7) is arranged on the other end of the pedal crankshaft (5), said pedal cranks each being screwed to the pedal crankshaft (5) on both sides by means of a fixing screw (8), characterized in that central through-extending bores (9) are arranged both axially in the pedal crankshaft (5) and axially also in the fixing screws (8), and the pedal crankshaft (5), the latter being dimensioned with a greater diameter in the mid-region (10) and provided in said region with a radial recess (11), in which both a lock housing (12) with a cylinder lock (13) and also a slider (17) are arranged; whereby a key (14) of the cylinder lock (13) axially penetrates the fixing screw (8) located closest to the cylinder lock, and an eccentric pin (16) is arranged on the opposite face side of the cylinder lock (13), said eccentric pin being actively connected via a eccentric pin guide (18) in a face side with the slider (17) displaceably arranged in the recess (11); and whereby a locking groove (19) provided with a central bore (21) is arranged in the face side disposed opposite the eccentric pin guide (18), with a locking head (23) of a lock pin (22) of a locking system projecting into said groove, said lock pin being insertable through the through-extending bore (9) of the opposite, second fixing screw (8), and the recess (11) in the pedal shaft (5).

2. The anti-theft device for bicycles according to claim 1, characterized in that the slider (17) is dimensioned in such a way that in the locking position, it engages at the same time a recess (31) in a bearing receptacle (3) extended by a locking bush (32).

3. The anti-theft device for bicycles according to claim 2, characterized in that the recesses (31) in the locking bush (32) are arranged in such a way that the slider (17) always engages the recess/recesses (31) when the pedals are in the vertical position.

4. The anti-theft device for bicycles according to claim 1, characterized in that the pin head (24) with an adjacent ring guide (25) on the side of the pedal crankshaft is arranged on the end of the lock pin (22) of the fixing system projecting beyond the fixing screw (8), with a locking ring (26) being plugged over said ring guide, whereby a flexible securing element (27) is secured both on the locking head (23) and on the locking ring (26).

5. The anti-theft device for bicycles according to claim 1, characterized in that a separate connector piece (28) with a securing element (27) arranged thereon is arranged on the lock pin (22) in such a way that the lock pin (22) is connected with the connector piece (28) in a form-locked manner by slipping over it a locking ring (26), the latter resting against the pin head (24) of the lock pin (22).

6. The anti-theft device for bicycles according to claim 1, characterized in that a locking bow (33) is mounted on the lock pin (22).

7. The anti-theft device for bicycles according to claim 1, characterized in that a locking ring (26), a pin head (24), or also a locking bow (33) are made of hardened or high-strength material.

8. The anti-theft device for bicycles according to claim 1, characterized in that cover elements may be arranged on one or both sides within the area of the through-extending bores (9) of the fixing screws (8).

9. The anti-theft device for bicycles according to claim 1, characterized in that in connection with special types of construction of the solution as defined by the invention, the key (14) can be pulled out only when the locking system is locked.

* * * * *